(No Model.)  3 Sheets—Sheet 1.
F. N. STEFFENS.
APPARATUS FOR TEACHING MELODIES.
No. 577,667.  Patented Feb. 23, 1897.
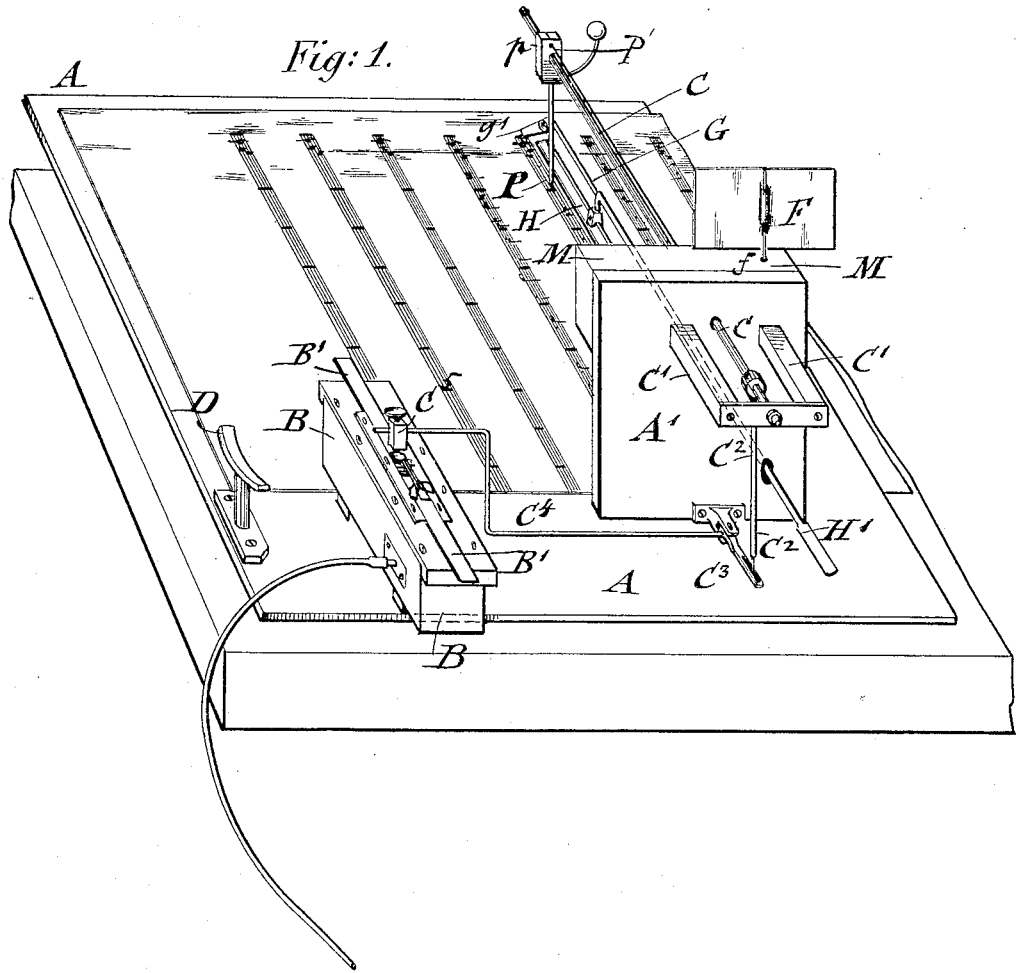
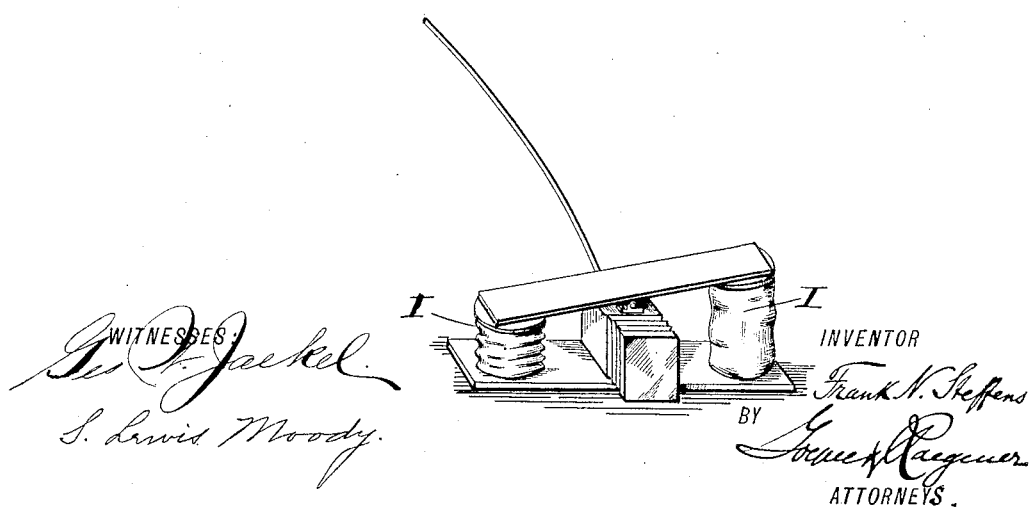
WITNESSES:  INVENTOR
Frank N. Steffens
BY
ATTORNEYS.

(No Model.) 3 Sheets—Sheet 2.

F. N. STEFFENS.
APPARATUS FOR TEACHING MELODIES.

No. 577,667. Patented Feb. 23, 1897.

(No Model.) 3 Sheets—Sheet 3.
F. N. STEFFENS.
APPARATUS FOR TEACHING MELODIES.

No. 577,667. Patented Feb. 23, 1897.

WITNESSES:
Geo. W. Jaekel
S. Lewis Moody.

INVENTOR
Frank N. Steffens
BY
Gorman Raegener
ATTORNEYS.

UNITED STATES PATENT OFFICE.

FRANK N. STEFFENS, OF BROOKLYN, NEW YORK.

APPARATUS FOR TEACHING MELODIES.

SPECIFICATION forming part of Letters Patent No. 577,667, dated February 23, 1897.

Application filed June 9, 1896. Serial No. 594,817. (No model.)

*To all whom it may concern:*

Be it known that I, FRANK N. STEFFENS, a citizen of the United States, residing at Brooklyn, in the county of Kings and State of New York, have invented certain new and useful Improvements in Apparatus for Teaching Melodies, of which the following is a specification.

The object of this invention is to furnish to persons who have a slight knowledge of music an apparatus by which the melody of a song or any other piece of music can be easily and correctly taught by the ear, both as regards the melody and time, the apparatus requiring but little practice in using the same and furnishing a handy and convenient means, especially when no piano is at hand, for learning the melody of any song or piece of music from the published note-sheet of the same; and the invention consists of an apparatus for teaching the melody of any song or piece of music, which comprises a horizontally traversing and vibrating pointer suspended over a sheet of music, a motor for moving said pointer over said sheet, gages for setting the apparatus successively to the center lines of the staffs, means for adjusting the oscillations of the pointer to the height of a given music-staff, a hand-rest, a melody-producing device located between said motor and the hand-rest, a sliding key-plate guided on said melody-producing device, connecting mechanism between the key-plate and the horizontal guide-rod of the pointer for vibrating the latter, and means for actuating the individual members of the melody-producing devices.

The invention consists, further, of certain details of construction and combinations of parts to be fully described hereinafter and finally pointed out in the claims.

Figure 2:
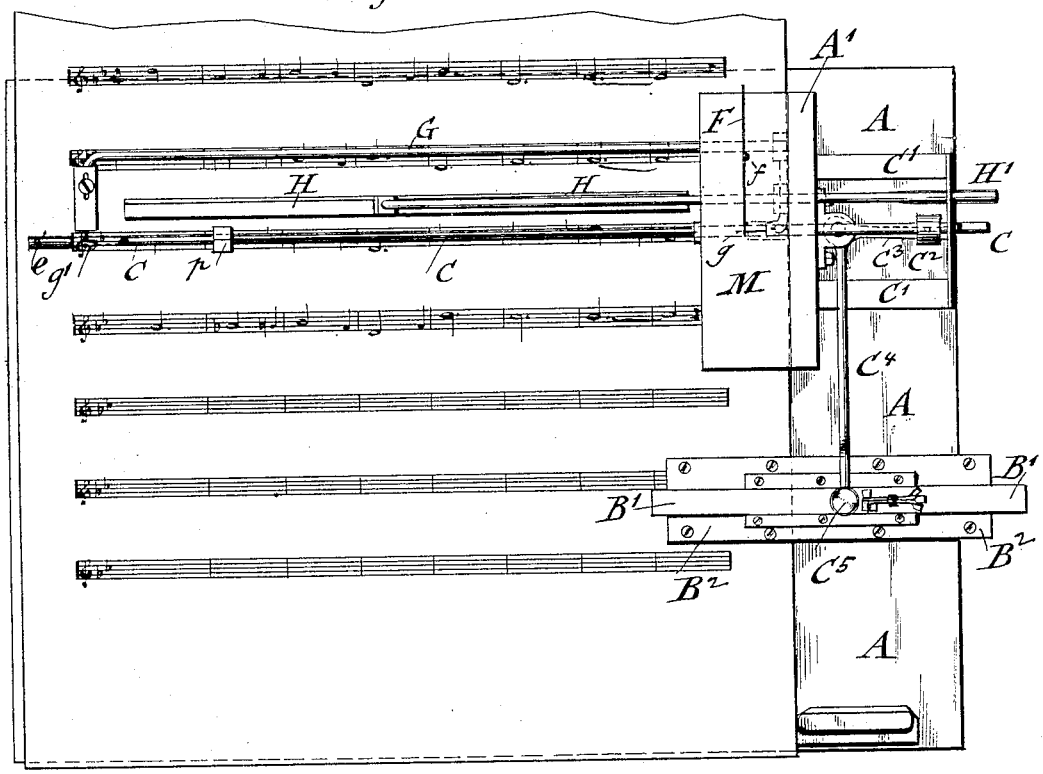
Figure 3:
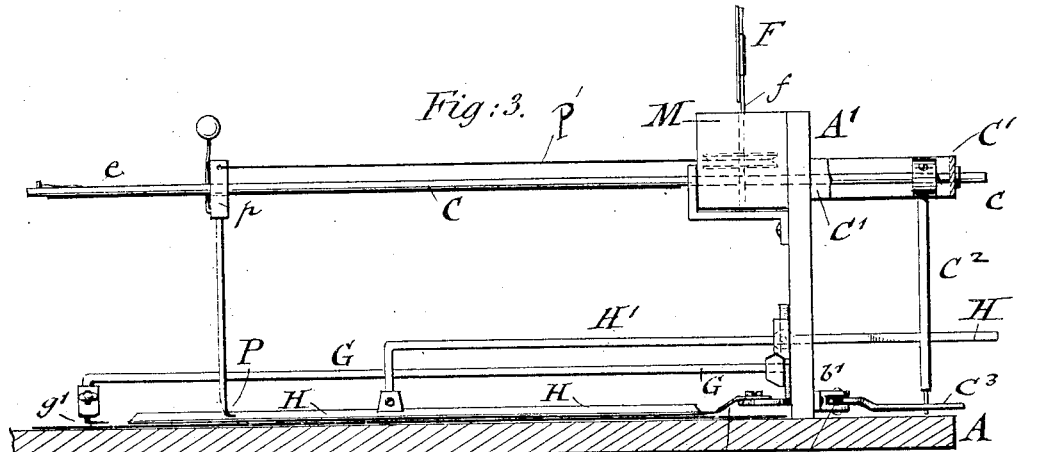
Figure 4:
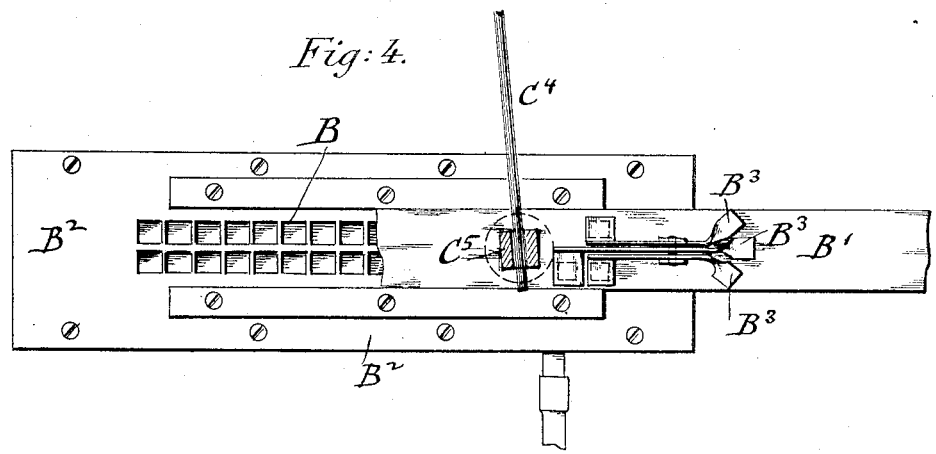
Figure 5:
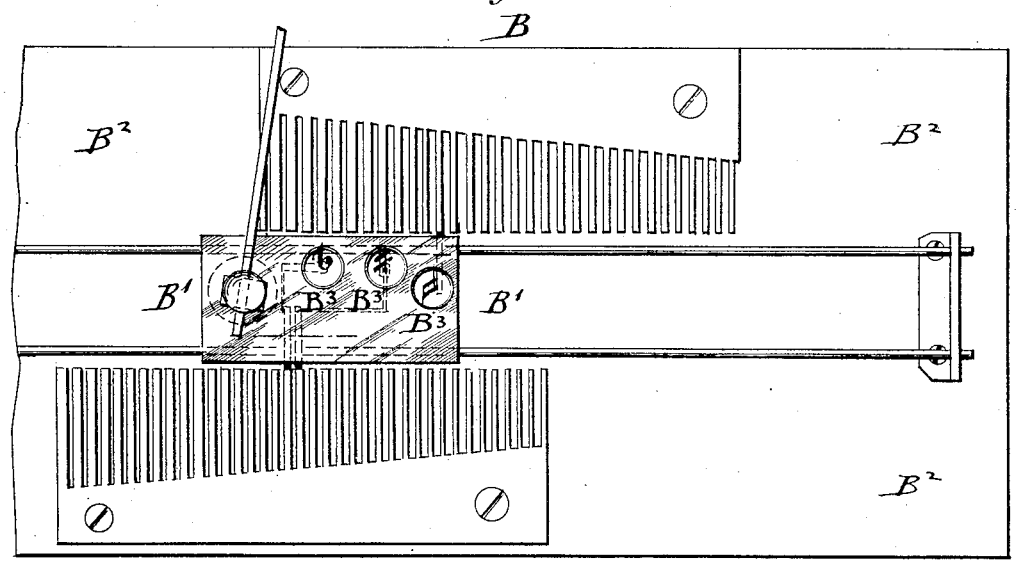

In the accompanying drawings, Figure 1 represents a perspective view of my improved apparatus for teaching the melody of any song or piece of music, showing the melody-producing device as being connected with a suitable bellows, so as to be operated pneumatically. Fig. 2 is a plan view of my improved apparatus. Fig. 3 is an elevation of a portion of the same, showing the modified and vibrating pointer, the pressure-bar, and the motor for actuating the pointer. Fig. 4 is a top view of a pneumatically-operated melody-producing device with its sliding key-plate; and Fig. 5 is a modified form of the melody-producing device, in which the melody is produced by means of combs, the tongues of which are actuated by keys on the sliding key-plate.

Similar letters of reference indicate corresponding parts.

Referring to the drawings, A represents an oblong base-board, to which the various parts of my improved apparatus for teaching the melody of any song or piece of music are applied, all the coöperative parts being supported either in position parallel with or at right angles to the inner edge of the base-board A.

To the base-board A is attached an upright plate A', on which is supported a suitable motor M in the nature of an ordinary clock-train. Near the motor M is arranged a melody-producing device B, and a hand-rest D near the latter. The relative arrangement of these parts is clearly shown in perspective in Fig. 1 and in plan view in Fig. 2. A horizontal guide-rod C extends at right angles to the upright supporting-plate A' through the same and the motor M, said guide-rod carrying at its outer end the counterbalanced slide-block $p$ of a vibrating pointer P. The slide-block $p$ is connected by a suitable cord or string $p'$ with the spring-drum of the motor, the spring of the drum being wound up by moving the slide-block on the guide-rod C to its furthermost position, so that a sufficient tension is imparted to the spring for moving the slide-block of the pointer over the horizontal guide-rod C toward the motor M. The speed by which the slide-block is moved over the guide-rod is regulated by means of interchangeable flies F, applied to the fly-spindle $f$ of the motor M, so that when less speed is required a larger fly, while when a greater speed is required a smaller fly, is placed on the fly-spindle. The opposite end of the guide-rod C is supported in the motor-frame and in a horizontal U-shaped bracket C', attached to the opposite side of the plate A', and prevented from shifting in the direction of its axis when the slide-block is moved over the same.

Near the base of the upright plate A is arranged a pointed gage $g$ and also a stationary horizontal arm G, that extends parallel with the guide-rod C and is about one inch longer than the same. The arm G is provided at its opposite end with a second downwardly-curved and pointed gage $g'$, which latter is located in a line drawn from the gage $g$ at right angles to the plate A', so that when a sheet of music is placed on the base-board A and along the plate A' the center line of any music-staff on the same can be readily alined with the gages $g\ g'$. As soon as this is accomplished a pressure-plate H, which is centrally pivoted to a fulcrumed and spring-actuated rod H', which passes through an opening in the upright plate A', is lowered onto the sheet, so that the same is firmly held in position on the base-board and alongside of the upright plate A' without being able to change or shift its position. The outer end of the fulcrumed and spring-actuated rod H' is flattened out, so as to form a thumb-rest for raising the pressure-plate whenever the sheet of music has to be shifted for placing the center line of the next staff in adjustment with the gages $g\ g'$. As soon as this is accomplished the handle of the lever of the pressure-plate is released and the latter applied to the sheet of music, so that the same is firmly held in position on the base-board of the apparatus.

The slide-block $p$ of the pointer P is guided along a longitudinal spline on the guide-rod C, so as to slide freely thereon, but follow the axial motion imparted to the guide-rod. The guide-rod C is prevented from following the lateral motion of the slide-block and is connected at its right-hand end with mechanism by which axial motion may be imparted to it. A stop $e$ at the left-hand end of the guide-rod C serves for arresting the slide-block $p$ when the same is moved over to the extreme left-hand end of the guide-rod E. To the right-hand end of the guide-rod C is clamped a downwardly-extending rod $C^2$, which is connected at its lower end with a slotted arm $C^3$, that is arranged at right angles to and connected with one end of a bent rod $C^4$, which is fulcrumed to a short bracket $b'$ on the upright plate A', while its opposite end is passed through a swivel-block $C^5$ on the sliding key-plate B' of the melody-producing device B. The lower end of the downwardly-extending rod $C^2$ can be adjusted in the slotted end of the arm $C^3$ and arranged in any suitable manner, so that thereby the axial play of the guide-rod C can be accurately adjusted for the slightly-varying heights of music-staffs used in published music. For a staff of greater height the axial motion of the guide-rod, and consequently the vibrating motion of the pointer, has to be larger, while for a staff of smaller height a proportionately smaller axial motion of the guide-rod is required, which is obtained by adjusting the connecting-rod either farther from or nearer to the bent connecting-arm $C^4$. The key-plate B' is guided in ways or rods of the top plate $B^2$ of the melody-producing device B, as shown in Figs. 4 and 5. To the key-plate B' three keys $B^3$ are pivoted, one for the natural sounds and one each for sounding the sharps and flats. The swivel-block $C^5$, to which the bent arm $C^4$ is clamped, is provided with a milled head which serves as a handle for moving the key-plate in either direction over the melody-producing device B, said head being taken hold of by the forefinger and thumb of the right hand, while the middle fingers of this hand are used for operating the keys. The sounds are produced pneumatically by means of reeds, to which wind is supplied from a wind-chest and bellows I, operated by the feet, as shown in Fig. 1, or the sounds are produced by means of combs, which are arranged alongside of the key-plate B, and which are actuated by suitable intermediate mechanisms between the keys and tongues, as shown in Fig. 5. The tongues of the combs are so tuned that one comb produces the natural while the other comb produces the sharp or flat sounds. Any other construction of the melody-producing device may be used, as various ways can be devised for producing the succession of sounds by which the melody is obtained. Furthermore, in place of the laterally traversing and vibrating pointer a stationary vibrating-pointer may be used, in which case a lateral motion has to be imparted to the sheet of music, which modifications I consider to be fully within the scope of my invention.

Operation: My improved apparatus for teaching the melody of any song or piece of music is operated as follows: A sheet of music is placed on the base-board and its uppermost music-staff placed in line with the gages $g\ g'$. The pressure-plate is then lowered so that the sheet is firmly held in position on the table or other support and alongside of the base-board without shifting. The slide-block of the pointer is next moved on the guide-rod against the tension of the spring of the motor M until arrested by the stop $e$ on the guide-rod. As the guide-rod is longer than the arm G the pointer can traverse over the guide-rod for a short distance, so as to give time to the right hand to be placed on the key-plate ready for operating the same. During the lateral motion of the slide-block the pointer is then placed on the bottom line of the staff by moving the key-plate, so as to enable it to clear the gage $g'$ on the arm G. The slide-block is then released and moved for a short space of time over the guide-rod until the pointer arrives at the gage $g$. The right hand in the meantime has taken hold of the head of the sliding key-plate, which in its normal position has to be located midway on the melody-producing device, so as to place the pointer over the center line of the staff. By moving the key-plate on the melody-producing device toward the left or right from its central position the pointer is compelled to follow this motion by the intermediate mechanism before described, and is thereby moved to a corresponding distance above and below the center line of the staff. By vibrating the pointer so to follow the relative position of the notes on the music-staff the key-plate is moved correspondingly over the melody-producing device. Simultaneously therewith the pointer and its slide-block are moved over the guide-rod under the action of the motor. The joint vibrating and traversing motion of the pointer, one caused by the motion of the key-plate, the other by the motor, produces the sounding of the reeds or tongues of the melody-producing device, either by the action of the bellows when a melody-producing device is operated pneumatically or by combs, the tongues of which are actuated by the keys of the key-plate, which latter mechanism requires, however, a little more practice than the pneumatically-operated melody-producing device. The length of time which the pointer is held over the notes of the piece of music governs the length of time for which one of the reeds or tongues is sounded, while the naturals, sharps, or flats are produced by the depression of the corresponding keys The result is a clear but comparatively faint rendition of the melody of the piece of music in proper tune and time, so that by repeating the same it can be readily impressed on the ear and retained by the party who uses the apparatus. When the key-plate is used in connection with a pneumatically-operated melody-producing device, the ends of the keys are provided with valves for permitting the escape of the air from the reed-chambers, while with the comb or music-box arrangement of the melody-producing device the tongues are operated by the intermediate mechanism, which is operated by pressure exerted on the respective keys.

My improved apparatus has the advantages that persons who are fond of music and have little or no theoretical knowledge of the same can readily learn without the use of a piano or other musical instrument any song and sing the same correctly. The use of the apparatus can be learned quickly and with little practice, as the motions of the parts are simple and can soon be acquired.

Having thus described my invention, I claim as new and desire to secure by Letters Patent—

1. An apparatus for teaching melodies, consisting of a vibrating and traversing pointer suspended above a sheet of music, a melody-producing device, and mechanism interposed between it and said pointer for vibrating the latter over said sheet as it traverses over the staffs of the sheet of music, substantially as set forth.

2. An apparatus for teaching melodies, which consists of a vibrating pointer suspended above a sheet of music, a motor connected with said pointer for moving it transversely over said sheet, a melody-producing device, and mechanism interposed between the latter and the pointer for imparting vibrating motion to the pointer as the melody-producing device is operated, substantially as set forth.

3. An apparatus for teaching melodies, consisting of a vibrating pointer, a horizontal guide-arm for said pointer, a motor connected with said pointer and adapted for moving it transversely on said guide-arm over a sheet of music, a melody-producing device, and mechanism interposed between the latter and the guide-arm for vibrating the latter while the pointer is moved over one of the staffs of a sheet of music, substantially as set forth.

4. An apparatus for teaching melodies, consisting of a vibrating and traversing pointer suspended over a sheet of music, a motor for moving the pointer transversely over said sheet, a melody-producing device provided with a sliding key-plate, keys on said key-plate, and mechanism connecting said key-plate with the pointer so as to vibrate the latter while passing over a staff of the sheet of music in proportion to the shifting motion of the key-plate, substantially as set forth.

5. In an apparatus for teaching melodies, the combination, with a horizontal guide-rod, of a vibrating pointer supported by a slide-block on the same, a motor, connected with said slide-block, gages arranged in line with the center of the music-staff, and a spring-actuated pressure-plate for holding the sheet of music firmly in line with said gages, substantially as set forth.

6. An apparatus for teaching melodies, comprising a horizontal and axially-movable guide-rod, a pointer supported by a slide-block on said guide-rod, a motor connected with said slide-block, a melody-producing device, a sliding key-plate on said melody-producing device, means for connecting the key-plate with the axially-movable guide-rod, a hand-rest near the melody-producing device, and means for actuating the melody-producing device, substantially as set forth.

7. In an apparatus for teaching melodies, the combination, with an axially-movable guide-rod, a pointer supported by a sliding block on said guide-rod, a melody-producing device, a sliding key-plate on the same, connecting mechanism between the key-plate and guide-rod, means for adjusting the axial motion of the guide-rod, and means for actuating the sound-producing devices of the melody-producing device on depressing either one of the keys of the key-plate, substantially as set forth.

8. In an apparatus for teaching melodies, the combination of a movable pointer suspended over the staff of a sheet of music, a motor for moving said pointer transversely over the sheet of music, a melody-producing device, and means between the melody-producing devices and the pointer for moving the latter up or down to any note on the staff as the pointer travels laterally over the sheet of music under the action of the motor, substantially as set forth.

In testimony that I claim the foregoing as my invention I have signed my name in presence of two subscribing witnesses.

FRANK N. STEFFENS.

Witnesses:
PAUL GOEPEL,
GEO. W. JAEKEL.